United States Patent [19]
Allport

[11] 3,855,517
[45] Dec. 17, 1974

[54] BATTERY CHARGING SYSTEMS FOR ROAD VEHICLES

[75] Inventor: Maurice James Allport, Stourbridge, England

[73] Assignee: The Lucas Electrical Company Limited, Birmingham, England

[22] Filed: May 1, 1973

[21] Appl. No.: 356,129

[30] Foreign Application Priority Data
May 10, 1972 Great Britain............... 21689/70

[52] U.S. Cl....................... 320/64, 320/68, 322/28
[51] Int. Cl. ............................................. H02j 7/24
[58] Field of Search ............ 320/61, 64, 68; 322/28

[56] References Cited
UNITED STATES PATENTS 3,539,864 11/1970 Harland et al. ................. 322/28 X
3,612,982 10/1971 Jones et al. ....................... 322/28
3,668,504 6/1972 Kawashima ....................... 320/64

Primary Examiner—J. D. Miller
Assistant Examiner—Robert J. Hickey
Attorney, Agent, or Firm—Holman & Stern

[57] ABSTRACT

A road vehicle battery charging system has an alternator charging the battery through a full wave rectifier, and a voltage regulator controlling the output of the alternator by varying the current flow in its field winding. The voltage regulator includes a resistance chain connected across the battery, and means is provided for ensuring that if the connection to the battery should become broken, then the regulator continues to operate.

1 Claim, 1 Drawing Figure

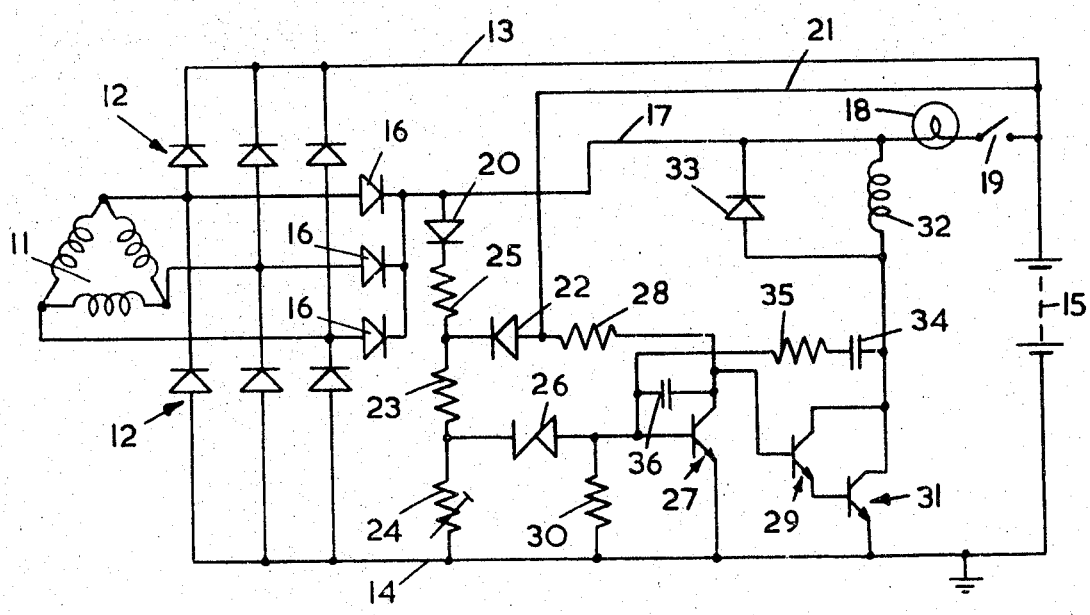

BATTERY CHARGING SYSTEMS FOR ROAD VEHICLES

This invention relates to battery charging systems for road vehicles.

A battery charging system according to the invention comprises in combination a battery having an earth terminal and a live terminal, an alternator and associated rectifier producing a d.c. voltage between a first output lead and earth, and also between a second output lead and earth, the first output lead being connected directly to the live battery terminal and the second output lead being connected to the live battery terminal through a warning lamp and the vehicle ignition switch in series, a voltage sensing lead having one end connected to the live battery terminal and its other end connected to earth through a first diode and a resistance chain in series, a Zener diode coupling a point on said resistance chain to the base of an input transistor, an output transistor connected in circuit with the field winding of the alternator between the second output lead and earth, means coupling the input and output transistors so that the input transistor controls the output transistor to regulate the output of the alternator, and a resistor and a second diode connected in series between the junction of the first diode and the resistance chain and the second output lead, the arrangement being such that normally current flows through the first diode and the alternator is regulated in accordance with the voltage of the battery, but if the voltage between the second output lead and earth rises above a predetermined value, current flows through the second diode and the alternator is regulated in accordance with the voltage between the second output lead and earth.

The accompanying drawing is a circuit diagram illustrating one example of the invention.

Referring to the drawing, the vehicle includes an alternator 11 supplying power through a full wave rectifier 12 to a pair of supply lines 13, 14 the line 14 being earthed and the vehicle battery 15 being connected between the lines 13, 14. The rectifier includes three additional diodes 16 providing power to a supply line 17 which is connected to the positive battery terminal through an ignition warning lamp 18 and the ignition switch 19 of the vehicle in series.

Connected to the positive terminal of the battery is a voltage sensing lead 21 which is connected to the line 14 through a diode 22 and a resistance chain consisting of a resistor 23 and a pre-set resistor 24 in series. The junction of the resistor 23 and diode 22 is connected through a resistor 25 and a diode 20 in series to the line 17, and the junction of the resistors 23, 24 is connected through a Zener diode 26 to the base of an n-p-n transistor 27 having its base connected to the line 14 through a resistor 30, its emitter connected to the line 14 and its collector connected through a resistor 28 to the sensing lead 21. The collector of the transistor 27 is further connected to the base of an n-p-n transistor 29 having its emitter connected to the base of an n-p-n transistor 31, the emitter of which is connected to the line 14. The collectors of the transistors 29 and 31 are connected to the line 17 through the field winding 32 of the alternator, the winding 32 being bridged by a free wheel diode 33. A further connection is made from the collectors of the transistors 29 and 31 through a capacitor 34 and a resistor 35 in series to the base of the transistor 27, and the collector and base of the transistor 27 are bridged by a capacitor 36 for minimising radio interference.

Even when the ignition switch is opened, current can flow from the battery through the diode 22 and resistors 23, 24 to earth, and also through the resistor 28 and the base-emitter paths of the transistors 29 and 31. However, the transistors 29 and 31 do not conduct because the switch 19 is open, and the current drain on the battery 15 is negligible. When the switch 19 is closed, the transistors 29 and 31 conduct to energise the winding 32, the current flow being by way of the lamp 18, which is illuminated. However, when the alternator produces an output, the line 17 assumes the same voltage as the line 13, and so the current flow through the transistors 29 and 31, and through the winding 32, is by way of the diodes 16 and the lamp 18 is extinguished.

In normal operation, because of the resistor 25, current flows from the lead 21 through the diode 22 and the resistors 23, 24. As soon as the alternator output voltage reaches a predetermined value, the Zener diode 26 conducts, turning on the transistor 27 which removes base current from the transistors 29 and 31. The circuit oscillates between one state with the transistor 27 on and the transistors 29 and 31 off, and another state with the transistor 27 off and the transistors 29 and 31 on, so that the mean current flow through the winding 32 is controlled in accordance with the current flow through the Zener diode 26, which is determined by the battery voltage. In this way, the output voltage of the alternator is regulated in accordance with the voltage of the battery 15.

In the event of the lead constituting the output line 13 becoming disconnected, for example as a result of being broken, then when the alternator output voltage rises, the current flowing through the diode 20 increases and the diode 22 becomes reverse biased. The Zener diode 26 now conducts a current which is determined by the voltage between the lines 17, 14, so that the alternator is still regulated, although its regulating voltage is raised by the increased voltage across the resistor 25.

If the lead 21 breaks, the transistors 29, 31 turn off and the alternator ceases to produce an output.

I claim:

1. A battery charging system for a road vehicle, comprising in combination a battery having an earth terminal and a live terminal, an alternator and associated rectifier producing a d.c. voltage between a first output lead and earth, and also between a second output lead and earth, the first output lead being connected directly to the live battery terminal and the second output lead being connected to the live battery terminal through a warning lamp and the vehicle ignition switch in series, a voltage sensing lead having one end connected to the live battery terminal and its other end connected to earth through a first diode and a resistance chain in series, a Zener diode coupling a point on said resistance chain to the base of an input transistor, an output transistor connected in circuit with the field winding of the alternator between the second output lead and earth, a first resistor coupling the collector of the input transistor and the base of the output transistor to said voltage sensing lead so that the input transistor controls the output transistor to regulate the output of the alternator, said voltage sensing lead connected at the junction of said first diode and said first resistor, and a second resistor and a second diode connected in series between the junction of the first diode and the resistance chain and the second output lead, the arrangement being such that normally current flows through the first diode and the alternator is regulated in accordance with the voltage of the battery, but if the voltage between the second output lead and earth rises above a predetermined value, current flows through the second diode and the alternator is regulated in accordance with the voltage between the second output lead and earth.

* * * * *